(12) United States Patent
Karmarkar

(10) Patent No.: US 9,042,921 B2
(45) Date of Patent: *May 26, 2015

(54) ASSOCIATION OF CONTEXT DATA WITH A VOICE-MESSAGE COMPONENT

(75) Inventor: Amit Karmarkar, Palo Alto, CA (US)

(73) Assignee: BUCKYBALL MOBILE INC., Palo Alto, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 12/706,296

(22) Filed: Feb. 16, 2010

(65) Prior Publication Data
US 2010/0145702 A1    Jun. 10, 2010

Related U.S. Application Data

(63) Continuation-in-part of application No. 12/422,313, filed on Apr. 13, 2009, and a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
H04W 4/14 (2009.01)
H04M 1/725 (2006.01)
H04L 12/58 (2006.01)

(52) U.S. Cl.
CPC ........... *H04M 1/7255* (2013.01); *H04L 12/581* (2013.01); *H04L 12/5895* (2013.01); *H04L 51/04* (2013.01); *H04L 51/38* (2013.01); *H04M 1/72569* (2013.01)

(58) Field of Classification Search
USPC ............................ 455/466, 403, 500.1–575.9
See application file for complete search history.

(56) References Cited

U.S. PATENT DOCUMENTS

| 4,959,785 | A | | 9/1990 | Yamamoto et al. |
| 5,493,692 | A | | 2/1996 | Theimer et al. |
| 5,517,409 | A | | 5/1996 | Ozawa et al. |
| 5,627,549 | A | * | 5/1997 | Park ............................. 701/300 |
| 5,797,098 | A | | 8/1998 | Schroeder et al. |
| 6,151,386 | A | * | 11/2000 | Argade ....................... 379/88.26 |
| 6,473,621 | B1 | | 10/2002 | Heie |
| 6,560,456 | B1 | | 5/2003 | Lohtia et al. |

(Continued)

FOREIGN PATENT DOCUMENTS

WO   WO-2007104487   9/2007

OTHER PUBLICATIONS

U.S. Appl. No. 11/742,242, filed Apr. 30, 2007, Maloney, David.

(Continued)

*Primary Examiner* — Phuoc H Doan

(57) ABSTRACT

Disclosed are a system, method, and article of manufacture of associating a context data with a voice-message component. The context data may be encoded into a voice message signal. The context-data may be associated with the voice-message component according to an attribute of the voice message. The attribute of the voice message may include at least one of a word, a phrase, a voice timbre, a duration of a pause between two words, a volume a voice and an ambient sound voice and a duration of a pause between two words. The context data may be selected according to a meaning of the attribute of the voice-message component.

11 Claims, 9 Drawing Sheets

(56) References Cited

U.S. PATENT DOCUMENTS

| | | | |
|---|---|---|---|
| 6,611,755 B1* | 8/2003 | Coffee et al. | 701/213 |
| 6,731,940 B1 | 5/2004 | Nagendran | |
| 6,750,883 B1 | 6/2004 | Parupudi et al. | |
| 6,785,869 B1 | 8/2004 | Berstis | |
| 6,813,507 B1 | 11/2004 | Gress et al. | |
| 6,816,578 B1 | 11/2004 | Kredo et al. | |
| 6,898,518 B2 | 5/2005 | Padmanabhan | |
| 6,963,839 B1 | 11/2005 | Ostermann et al. | |
| 6,964,020 B1 | 11/2005 | Lundy | |
| 6,966,035 B1 | 11/2005 | Suess et al. | |
| 6,990,180 B2 | 1/2006 | Vuori | |
| 6,993,553 B2 | 1/2006 | Kaneko et al. | |
| 7,072,956 B2 | 7/2006 | Parupudi et al. | |
| 7,123,694 B1* | 10/2006 | Hecker | 379/88.05 |
| 7,177,902 B2 | 2/2007 | Hubbard | |
| 7,181,387 B2 | 2/2007 | Ju et al. | |
| 7,207,004 B1 | 4/2007 | Harrity | |
| 7,254,773 B2 | 8/2007 | Bates et al. | |
| 7,272,406 B2 | 9/2007 | Chava et al. | |
| 7,293,074 B1 | 11/2007 | Jellinek et al. | |
| 7,305,230 B2 | 12/2007 | Zhigang | |
| 7,315,902 B2 | 1/2008 | Kirkland | |
| 7,359,714 B2 | 4/2008 | Parupudi et al. | |
| 7,363,357 B2 | 4/2008 | Parupudi et al. | |
| 7,366,500 B1 | 4/2008 | Yalovsky et al. | |
| 7,424,682 B1 | 9/2008 | Pupius et al. | |
| 7,551,935 B2 | 6/2009 | Karmakar | |
| 7,580,719 B2 | 8/2009 | Karmarkar | |
| 7,738,912 B1* | 6/2010 | Hawkins et al. | 455/550.1 |
| 7,742,774 B2* | 6/2010 | Oh et al. | 455/456.1 |
| 7,869,796 B2* | 1/2011 | Lee et al. | 455/412.2 |
| 2002/0077135 A1 | 6/2002 | Hyon | |
| 2002/0173294 A1 | 11/2002 | Nemeth et al. | |
| 2002/0187794 A1 | 12/2002 | Fostick et al. | |
| 2002/0193996 A1* | 12/2002 | Squibbs et al. | 704/260 |
| 2002/0198715 A1 | 12/2002 | Belrose | |
| 2003/0023424 A1 | 1/2003 | Weiner | |
| 2003/0078033 A1 | 4/2003 | Sauer et al. | |
| 2003/0085989 A1 | 5/2003 | Tay | |
| 2003/0125927 A1 | 7/2003 | Seme | |
| 2003/0144895 A1 | 7/2003 | Aksu et al. | |
| 2003/0186716 A1 | 10/2003 | Dorenbosch et al. | |
| 2003/0207701 A1* | 11/2003 | Rolnik et al. | 455/564 |
| 2003/0236658 A1 | 12/2003 | Yam | |
| 2004/0024683 A1 | 2/2004 | Morciniec et al. | |
| 2004/0034561 A1 | 2/2004 | Smith | |
| 2004/0044517 A1 | 3/2004 | Palmquist | |
| 2004/0092272 A1 | 5/2004 | Valloppillil | |
| 2004/0102201 A1 | 5/2004 | Levin | |
| 2004/0102956 A1 | 5/2004 | Levin | |
| 2004/0110493 A1 | 6/2004 | Alvarez et al. | |
| 2004/0122979 A1 | 6/2004 | Kirkland | |
| 2004/0158471 A1 | 8/2004 | Davis et al. | |
| 2004/0176114 A1* | 9/2004 | Northcutt | 455/466 |
| 2004/0179545 A1 | 9/2004 | Erola et al. | |
| 2004/0194141 A1 | 9/2004 | Sanders | |
| 2004/0215526 A1 | 10/2004 | Luo et al. | |
| 2004/0221256 A1 | 11/2004 | Martin et al. | |
| 2004/0221260 A1 | 11/2004 | Martin et al. | |
| 2004/0235503 A1 | 11/2004 | Koponen et al. | |
| 2004/0248591 A1 | 12/2004 | Fish | |
| 2004/0253963 A1 | 12/2004 | Park et al. | |
| 2004/0266462 A1 | 12/2004 | Chava et al. | |
| 2005/0003804 A1* | 1/2005 | Huomo et al. | 455/414.1 |
| 2005/0003837 A1 | 1/2005 | Midkiff et al. | |
| 2005/0004840 A1 | 1/2005 | Wanninger | |
| 2005/0027608 A1 | 2/2005 | Wiesmuller et al. | |
| 2005/0038892 A1 | 2/2005 | Huang et al. | |
| 2005/0066044 A1 | 3/2005 | Chaskar et al. | |
| 2005/0128967 A1 | 6/2005 | Scobbie | |
| 2005/0136994 A1* | 6/2005 | Bahl et al. | 455/574 |
| 2005/0171944 A1 | 8/2005 | Palmquist | |
| 2005/0188273 A1* | 8/2005 | Angelo et al. | 714/39 |
| 2005/0191963 A1 | 9/2005 | Hymes | |
| 2005/0198174 A1* | 9/2005 | Loder et al. | 709/206 |
| 2005/0198304 A1 | 9/2005 | Oliver et al. | |
| 2005/0221820 A1* | 10/2005 | Ruetschi | 455/432.3 |
| 2005/0239518 A1* | 10/2005 | D'Agostino et al. | 455/574 |
| 2005/0245241 A1* | 11/2005 | Durand et al. | 455/414.1 |
| 2005/0266829 A1* | 12/2005 | Tran et al. | 455/412.1 |
| 2005/0267749 A1 | 12/2005 | Yamada et al. | |
| 2006/0019724 A1* | 1/2006 | Bahl et al. | 455/574 |
| 2006/0135181 A1 | 6/2006 | Dale et al. | |
| 2006/0167992 A1 | 7/2006 | Cheung et al. | |
| 2006/0212621 A1 | 9/2006 | Ash et al. | |
| 2006/0223518 A1* | 10/2006 | Haney | 455/420 |
| 2007/0027673 A1 | 2/2007 | Moberg | |
| 2007/0032244 A1* | 2/2007 | Counts et al. | 455/456.1 |
| 2007/0076877 A1 | 4/2007 | Camp et al. | |
| 2007/0130170 A1 | 6/2007 | Forney | |
| 2007/0197229 A1* | 8/2007 | Kalliola et al. | 455/456.1 |
| 2007/0208813 A1 | 9/2007 | Blagsvedt et al. | |
| 2007/0254593 A1* | 11/2007 | Jollota et al. | 455/67.11 |
| 2008/0005068 A1* | 1/2008 | Dumais et al. | 707/3 |
| 2008/0025482 A1 | 1/2008 | Susama et al. | |
| 2008/0043718 A1 | 2/2008 | Chu | |
| 2008/0059152 A1 | 3/2008 | Fridman et al. | |
| 2008/0076409 A1 | 3/2008 | Hinrikus et al. | |
| 2008/0133228 A1* | 6/2008 | Rao | 704/231 |
| 2008/0133336 A1 | 6/2008 | Altman et al. | |
| 2008/0243619 A1 | 10/2008 | Sharman et al. | |
| 2008/0311934 A1 | 12/2008 | Soderstrom | |
| 2009/0055739 A1 | 2/2009 | Murillo et al. | |
| 2009/0082042 A1 | 3/2009 | Harendra et al. | |
| 2009/0124272 A1 | 5/2009 | White et al. | |
| 2009/0129372 A1 | 5/2009 | Pandey et al. | |
| 2009/0147778 A1 | 6/2009 | Wanless et al. | |
| 2009/0163183 A1 | 6/2009 | O'Donoghue et al. | |
| 2009/0175499 A1 | 7/2009 | Rosenblatt | |
| 2009/0254529 A1 | 10/2009 | Goldentouch | |
| 2009/0282030 A1 | 11/2009 | Abbott et al. | |
| 2010/0048290 A1 | 2/2010 | Baseley et al. | |

OTHER PUBLICATIONS

"About ContractBuddy"; http://www.contractbuddy.com/aboutCB/features.htm.

"Electronic negotiations, media, and transactions in socioeconomic interactions"; Yuan; http://intemeg.org!enegotiationlresourceslonline_info,html.

"Distributed PeCo-Mediator: Finding Partners via Personal Connections" Ogata etal.

"What Can Computer Programs Do to Facilitate Negotiation Processes?"; Chaudhury. et al.; 1991 ACM 0-89791-456-2/91/0010/0269.

"Speech Centric Multimodal Interfaces for Mobile Communication Systems"; Kvale et al.; Telektronikk Feb. 2003; p. 104-117.

"Dumas—Adaptation and Robust Information Processing for Mobile Speech Interfaces"; Jokinien et al.

"Google SMS: How to Use"; http://www.google.com/smslhowtouse.html.

Author(s) unknown, Voice SMS—Client & Clientless Solutions Fun Talk SMS, V2V SMS, VoiceSMSData Sheet 1,publication date unknown (copyright 2008), published by Movius.

Yasuto Nakanishi et al "Context Aware Messaging Service:A Dynamic Messaging Delivery Using Location Information and Schedule Information," Personal Technologies (2000)Abstract.

* cited by examiner

US 9,042,921 B2

ASSOCIATION OF CONTEXT DATA WITH A VOICE-MESSAGE COMPONENT

CLAIM OF PRIORITY

This application is a continuation-in-part of and claims priority to patent application Ser. No. 12/422,313 filed on Apr. 13, 2009 which claims priority from provisional application 61/161,763 filed on Mar. 19, 2009. Patent application Ser. No. 12/422,313 is a continuation-in-part of patent application Ser. No. 11/519,600 filed Sep. 11, 2006, issued as U.S. Pat. No. 7,551,935. Patent application Ser. No. 11/519,600 is a continuation-in-part of patent application Ser. No. 11/231,575 filed Sep. 21, 2005, issued as U.S. Pat. No. 7,580,719.

FIELD OF TECHNOLOGY

This disclosure relates generally to a communication system, and, more particularly, to a system, a method and an article of manufacture of association of context data with a voice-message component.

BACKGROUND

A computer system such as a mobile device (e.g. a smart phone) may include sensors. The sensors may detect attributes of the computer system's environment. The mobile device may transform the attributes into context data. The computer system may also be communicatively coupled with an external server and/or database (e.g. via the Internet). The external server and/or database may provide additional context data to the computer system. For example, the computer system may use the external server and/or database to acquire supplemental information about the context data.

At the same time, the computer system may also include a voice-messaging application (e.g. voice mail, short voice messaging, voice SMS, IP telephony voice communication, cellular network voice-call capability). A user of the computer system may communicate a voice message. Portions of the voice message may be related to certain context data available in the computer system. This context data may be useful to a receiver when listening to the voice message. Without the available context data, the receiver may not understand the voice message. The receiver may need to query the sending user with additional questions to clarify the meaning of the text message.

SUMMARY

A system, method, and article of manufacture of an association of context data with a voice-message component are disclosed. In one aspect, a context data is associated with a voice-message component. The context data may be encoded into a voice message signal. The voice message may comprise a short voice message. The context data may be associated with the voice-message component according to an attribute of the voice message. The attribute of the voice message may comprise at least one of a word, a phrase, a voice timbre, a duration of a pause between two words, a volume of a voice and an ambient sound.

In another aspect, a voice-message application is provided. A voice message is generated with the voice-message application. A context-data related to a voice-message component is determined. The context data is linked with the voice-message component.

The voice-message application may comprise at least one of a voice-mail application, a short voice-message application, a voice short-message service (SMS) application, an interne protocol (IP) telephony voice communication application and a cellular network voice-call application. A voice-message application of a mobile device may be provided. The context data may be acquired with a sensor of the mobile device. Supplemental information about the context-data may be acquired from a data store comprising historical context-data information, voice recognition data, and sound recognition data.

In yet another aspect, a system comprises a processor, a computer-readable memory communicatively coupled with the processor, a voice-message application resident on the computer-readable memory to generate a voice message, and a context-data application to determine a context-data related to a voice-message component and to link the context-data with the voice-message component. The system may include a sensor to acquire a context data. The system may further include a machine-learning application to incorporate intelligence into the context-data application.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a system, method, and article of manufacture of association of context data with a voice-message component. Although the present embodiments have been described with reference to specific example embodiments, it will be evident that various modifications and changes may be made to these embodiments without departing from the broader spirit and scope of the various claims.

Figure 1:
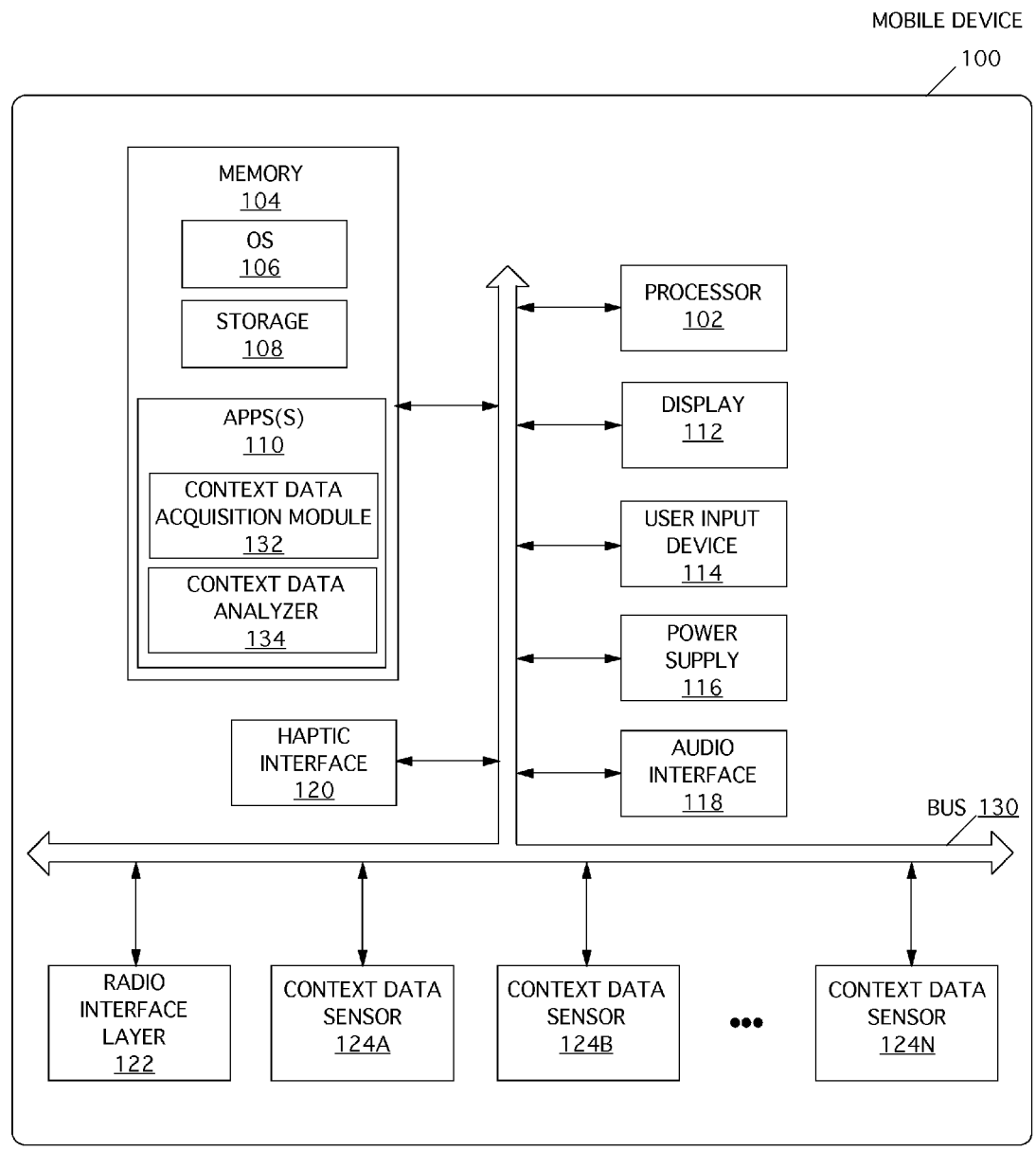
FIG. 1 shows a functional block diagram of an example mobile device, according to one embodiment.

FIG. 1 shows a functional block diagram of an example mobile device, such as mobile device 100, according to one embodiment. In one embodiment, the mobile device 100 may be a smart-phone system such as the iPhone™, Motorola Droid™, Blackberry™, or the Nexus One™. It should be noted that in other example embodiments, another type of computing device (e.g. a personal computer, a tablet computer, a portable media player, personal digital assistant, and/or Wi-Fi mobile platform) may perform the same functionalities as the mobile device 100. Consequently, FIG. 1 should not be interpreted as being exclusive only to mobile devices with regards to other example embodiments.

The mobile device 100 includes a processor 102. The processor 102 may execute software programs resident in the memory 104. The memory 104 may includes both volatile memory (e.g., RAM) and non-volatile memory (e.g., ROM, Flash Memory, or the like). An operating system 106 may be resident in the memory 104. The operating system 106 may execute on the processor 102 and manage the activities and the sharing of the resources of the mobile device 100. Example operating systems that may be used include, inter alia, a Mac OS X, a Unix-like OS, a Symbian OS, a BlackBerry OS, an Android OS, a Palm OS and a Windows Mobile OS. In one embodiment, the user input device 114 may be a push button numeric dialing pad (such as on a typical telephone). In another embodiment, the user input device may be a multi-key keyboard (such as a conventional keyboard or a keyboard scaled for optimized "thumbing"). In yet other example embodiments, input may accomplished by orienting the mobile device in certain patterns and/or by voice-input commands. The display 112 may be a liquid crystal display, or any other type of display commonly used in mobile devices. The display 112 may be touch-sensitive (e.g. a capacitive touchscreen), and would then also include an input device. One or more application programs 110 are loaded into memory 104 and run on the operating system 106. The application programs 110 include, inter alia, the context-data acquisition module 132 and the context-data analyzer 134.

Figure 5:
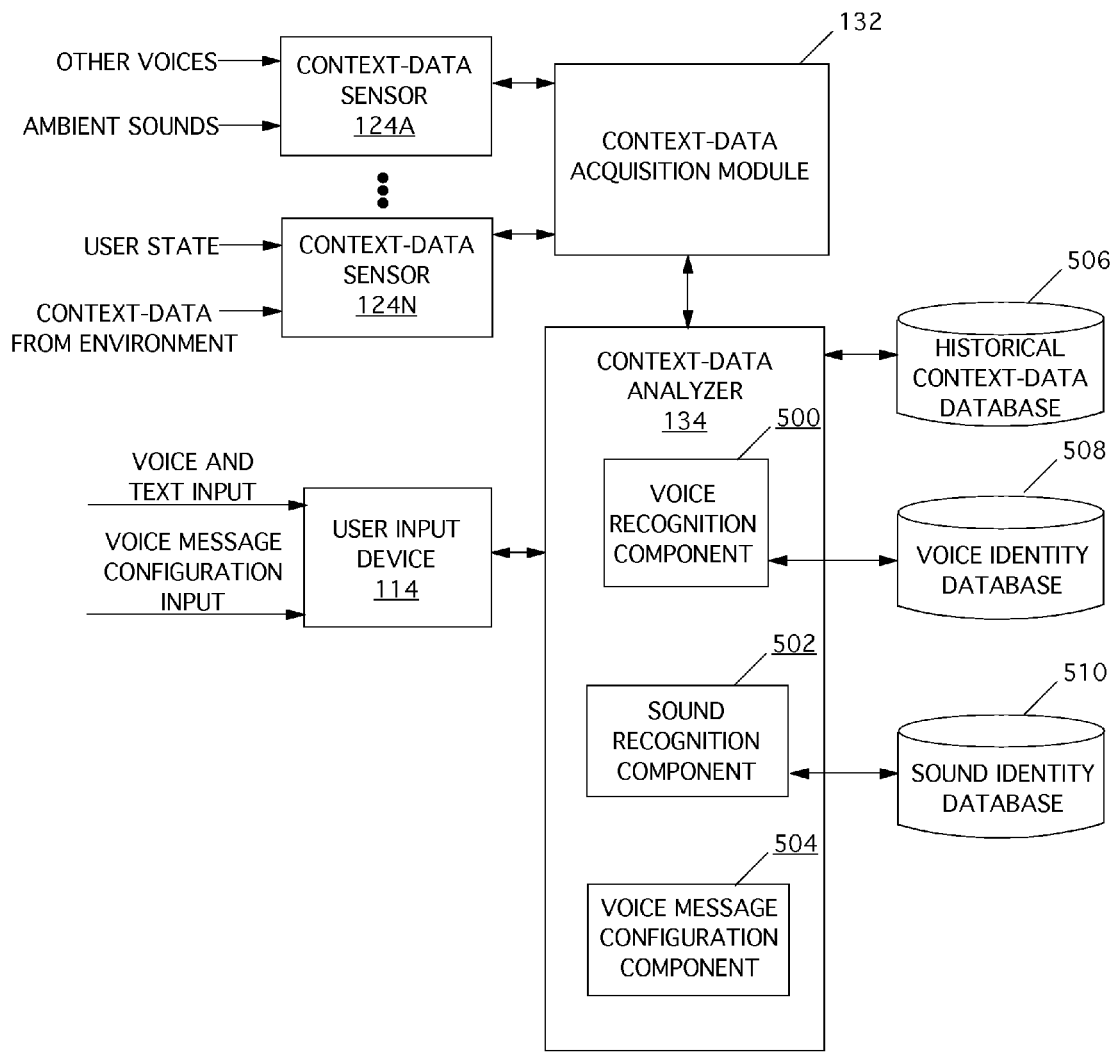
FIG. 5 illustrates a particular example system that can determine context data and associate the context data with a voice-message component, according to one embodiment.

The context-data acquisition module 132 may be utilized to gather data and information from at least one context-data sensor 124 A-N. Although specific examples of types of data and information that may be utilized as context data are described infra, it is to be understood that the context-data acquisition module 132 can obtain, receive and/or access any type of information that can subsequently be employed to establish the context of the mobile device 100. More particularly, the context-data acquisition module 132 may be employed to generate, receive and/or obtain the context data (e.g. context-related information). As shown in FIG. 5 infra, in one aspect, the context-data acquisition module 132 may also interact with a user to obtain information to establish a context. In a specific aspect, a user may utilize a user input device 114 (e.g. a microphone) to input a voice message into the mobile device 100 A-N. The context-data acquisition module 132 may acquire a digital copy of the voice message and retrieve context data from the voice message (e.g. other voices in background, ambient sounds). The context-data acquisition module 132 may then communicate the digital copy of the voice message to the context-data analyzer 134. The context-data acquisition module 132 may also modulate the power provided to various context-data sensors 124 A-N according which types of context-data are currently being acquired.

The context-data analyzer 134 may analyze user input such as voice message (or in other embodiments, a combination of voice, text and other forms of user input such as the orientation of the mobile device 100). The context-data analyzer 134 may then determine a certain type of context data to associate with a voice-message component. The context-data analyzer 134 may associate the context-data with a voice-message component. For example, the context-data analyzer 134 may determine an attribute of a voice-message component. The context-data analyze 134 may then determine a meaning of the attribute of voice-message component (e.g. with a table that includes both attributes and meanings of the attributes). The context-data analyzer 134 may also analyze a voice message and provide instructions to the context-data acquisition module 132 as to which types of context data to acquire.

In addition to associating a context-data with a voice-message component, the context data analyzer 134 may modify a voice message signal, according to certain embodiments. For example, the context-data analyzer 134 may modify a data packet used to transport voice message data to include associated context-data and/or metadata about the context data and/or the association. In another aspect, the context-data analyzer 134 may utilize a voice-message configuration component of FIG. 5, infra, to configure a voice message to include both voice message data and associated context-data (and in some embodiments include supplemental information about the context-data). In another aspect, the context-data analyzer 134 may modify a voice-message data packet to include on voice message data and metadata about the association of the voice message data with a context-data. The context-data analyzer 134 may then communicate the context-data in a separate data packet to a server that is accessible by other mobile devices 100 A-N within a particular network (e.g. the networks illustrated by FIGS. 3 and 4 infra).

Machine learning systems (implicitly as well as explicitly trained) may be employed to provide automated action in connection with the operations performed by the context-data acquisition module 132 and the context-data analyzer 134. In other words, the certain embodiments may employ a machine-learning and reasoning component (not shown) which facilitates automating one or more features in accordance with various embodiments described herein. Certain embodiments may employ various AI-based schemes for carrying out these operations. For example, the context-data analyzer 134 may utilize a process for determining a context of mobile device 100 and associating the context-data with a voice-message component may be facilitated via an automatic classifier system and process. A classifier is a function that maps an input attribute vector, $x=(x1, x2, x3, x4, xn)$, to a confidence that the input belongs to a class, that is, $f(x)=$ confidence(class). Such classification may employ a probabilistic and/or statistical-based analysis to infer an action or state that corresponds to user. A support vector machine (SVM) is an example of a classifier that may be employed by the context-data analyzer 134. Other classification approaches include, e.g., naive Bayes, Bayesian networks, decision trees, neural networks, fuzzy logic models, and probabilistic classification models providing different patterns of independence may be employed. Classification, as used herein, may also be inclusive of statistical regression utilized to develop models of priority. The context-data analyzer 134 may employ classifiers that are explicitly trained (e.g., via a generic training data) as well as implicitly trained (e.g., via observing user behavior, receiving extrinsic information). For example, SVM's may be configured via a learning or training phase within a classifier constructor and feature selection module. Thus, the classifier(s) may be used to automatically learn and perform a number of functions, including but not limited to determining according to a predetermined criteria where a user is located, where a user is going, what action a user is performing, what action a user is going to perform, the present context of the mobile device 100, a predicted future context of the mobile device 100, a higher-order context data, etc.

Statistical machine learning methods may be employed to build models that identify or rank informational items differently based on inferences about context data and/or attributes of the voice-message component. Databases (e.g. the storage 108 and the context-data stores of FIGS. 3 and 4, infra, and/or the memory 104) may store cases of events representing informational items, that were identified implicitly or explicitly as being desirable or valuable in specific contexts, may be used to build custom-tailored ranking functions that facilitate the operations performed by the context-data acquisition module 132 and the context-data analyzer 134. In some cases, context-sensitive parameters may be passed to ranking functions. In other cases, ranking functions may be more holistically optimized for performance in different the operations and/or contexts. For example, in cases where there is uncertainty as to a particular context of the mobile device 100, inferences about the probability distributions over the potential contexts at hand may be taken as inputs in retrieval systems of the mobile device 100. These retrieval systems may mix the outputs of multiple ranking systems in a probabilistically coherent manner to provide different kinds of mixtures of results, including an overall ranking and clusters of results, showing the most relevant for each of the potentially active clusters. The context-data analyzer 134 may also utilize these machine-learning systems in voice and sound recognition operations.

Other example application programs 110 include phone dialer programs, email programs, scheduling programs, PIM (personal information management) programs, word processing programs, spreadsheet programs, Internet browser programs, instant messaging programs, user interfaces, commercial smart-phone applications (e.g. the Siri Personal Assistant™), Voice over Internet Protocol (VoIP) applications, voice mail applications, short voice messaging applications, voice SMS applications, instant messaging applications, voice recognition functionalities, sound recognition functionalities, voice-to-text functionalities, machine-learning functionalities, gesture-based computer interface applications, and so forth. In one example embodiment, the context data and/or additional data about the context-data may be acquired from these application programs 210.

The mobile device 100 also includes storage 108 within the memory 104. In one embodiment, the storage 108 may be a non-volatile form of computer memory. The storage 108 may be used to store persistent information which should not be lost if the mobile device 100 is powered down. In another example embodiment, the storage 108 may store context data information such as data derived from a context-data sensor described infra and/or historical context data.

The applications 110 may use and store information in the storage 108, such as e-mail or other messages used by an e-mail application, contact information used by a PIM, appointment information used by a scheduling program, documents used by a word processing program, instant messaging information used by an instant messaging program, context data, context data metrics, voice message use by a voice messaging system, text message used by a text messaging system and the like (see description of FIG. 5 infra for other examples). The mobile device 100 has a power supply 116, which may be implemented as one or more batteries. The mobile device 100 is also shown with an audio interface 118 and a haptic interface 120. The audio interface 118 may provide audible signals to and receive audible signals from the user. For example, the audio interface 118 may be communicatively coupled to a speaker for providing audible output and to a microphone for receiving audible input, such as to facilitate a telephone conversation. The haptic interface 120 may be used to provide haptic signals to the user. In another example embodiment, the context-meter application 103 may generate an audio and/or a haptic signal with a magnitude related to a value of a context data metric. The mobile device 100 also includes a radio interface layer 122 that performs the function of transmitting and receiving radio frequency communications. The radio interface layer 122 facilitates wireless connectivity between the mobile device 100 and the outside world, via a communications carrier or a service provider. Transmissions to and from the radio interface layer 122 are conducted under control of the operating system 106. Communications received by the radio interface layer 122 may be disseminated to application programs 110 via the operating system 106, and vice versa.

The mobile device 100 further includes at least one context data sensor 124 A-N. In one embodiment, the context-data sensor 124 A-N may be a device that measures, detects or senses an attribute of the mobile device's environment and then converts the attribute into a signal which can be read by context-data acquisition module 132. Example context-data sensors include, inter alia, global positioning system receivers, accelerometers, inclinometers, position sensors, barometers, WiFi sensors, RFID sensors, gyroscopes, pressure sensor, pressure gauges, time pressure gauges, torque sensors, ohmmeters, thermometers, infrared sensors, microphones, image sensors (e.g. digital cameras), biosensors (e.g. photometric biosensors, electrochemical biosensors), capacitance sensors, radio antennas and/or capacitance probes. It should be noted that the other sensor devices other than those listed may also be utilized to sense context data. In other certain example embodiments, context data may also include a signal comprising information about another mobile device and/or an external computing system such as the Context-data server 200, a third-party server (e.g. an Internet map server) or a database (e.g. the storage 108 and/or a database external to the mobile device 100). The bus 130 may be a subsystem that transfers data between computer components. In operation, information acquired by the context-data sensors may be processed by the various applications 110 in order to assist in determining a context of the mobile device 100 A-N.

Figure 2:
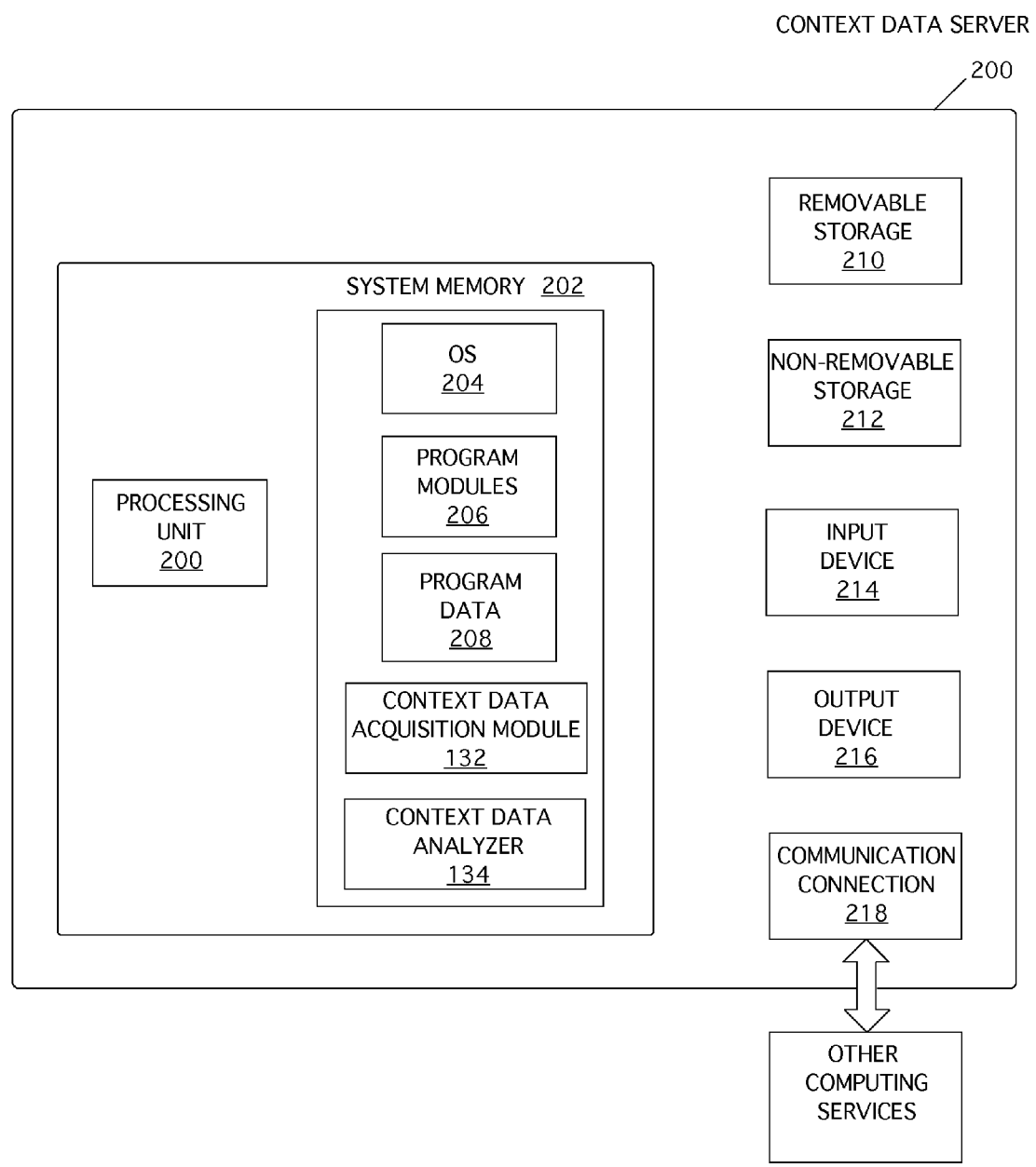
FIG. 2 shows a block diagram of a computer, such as a context-data server, operable to execute the disclosed architecture of associating context-data with a voice-message component, according to one embodiment.

FIG. 2 shows a block diagram of a computer, such as the context-data server 200, operable to execute the disclosed architecture of associating context-data with a voice-message component, according to one embodiment. In a basic configuration, the context-data server 200 typically includes at least one processing unit 200 and system memory 202. Depending on the exact configuration and type of computing device, system memory 202 may be volatile (such as RAM), non-volatile (such as ROM, flash memory, etc.) or some combination of the two. The system memory 202 generally includes an operating system 204, one or more program modules 206, and other program data 208. The system memory 202 may also include any of the applications described above in reference to the mobile device 100 of FIG. 1. Particularly, in one embodiment, the context-data server 200 may include a context-data analyzer 222 with the same functionality as the context-data analyzer 134. Thus, the context-data server 200 may provide a resource to scale the processing power and battery resources of the mobile device 100. In other embodiments, the context-data server 200 may also be utilized to acquire, determine, rank and associate various context-data from multiple mobile device sources. Additionally, the context-data server 200 may utilize a separate context-data store (e.g. the context-data stores of FIGS. 3 and 4) to scale the data storage resources of mobile devices 100 A-N implemented in the example networks illustrated by FIGS. 3 and 4 infra.

The context-data server 200 may have additional features or functionalities. For example, the context-data server 200 may also include additional data storage devices (removable and/or non-removable) such as, for example, magnetic disks, optical disks, or tape. Such additional storage is illustrated in FIG. 2 by removable storage 210 and non-removable storage 212. Example, computer storage media may include volatile and nonvolatile, removable and non-removable media implemented in any method or technology for storage of information, such as computer readable instructions, data structures, program modules, or other data. The system memory 202, removable storage 210 and non-removable storage 212 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, firmware, magnetic disk storage or other magnetic storage devices, or any other medium which storage media may be part of the context-data server 200. These computer storage media may include computer-executable instructions for implementing the various embodiments described herein. The context-data server 200 may also have input device(s) 214 such as a keyboard, a mouse, a pen, a voice input device, a gesture-based interface and/or a touch-sensitive input device. Output device(s) 216 such as a display, speakers, printer, etc. may also be included.

Figure 3:
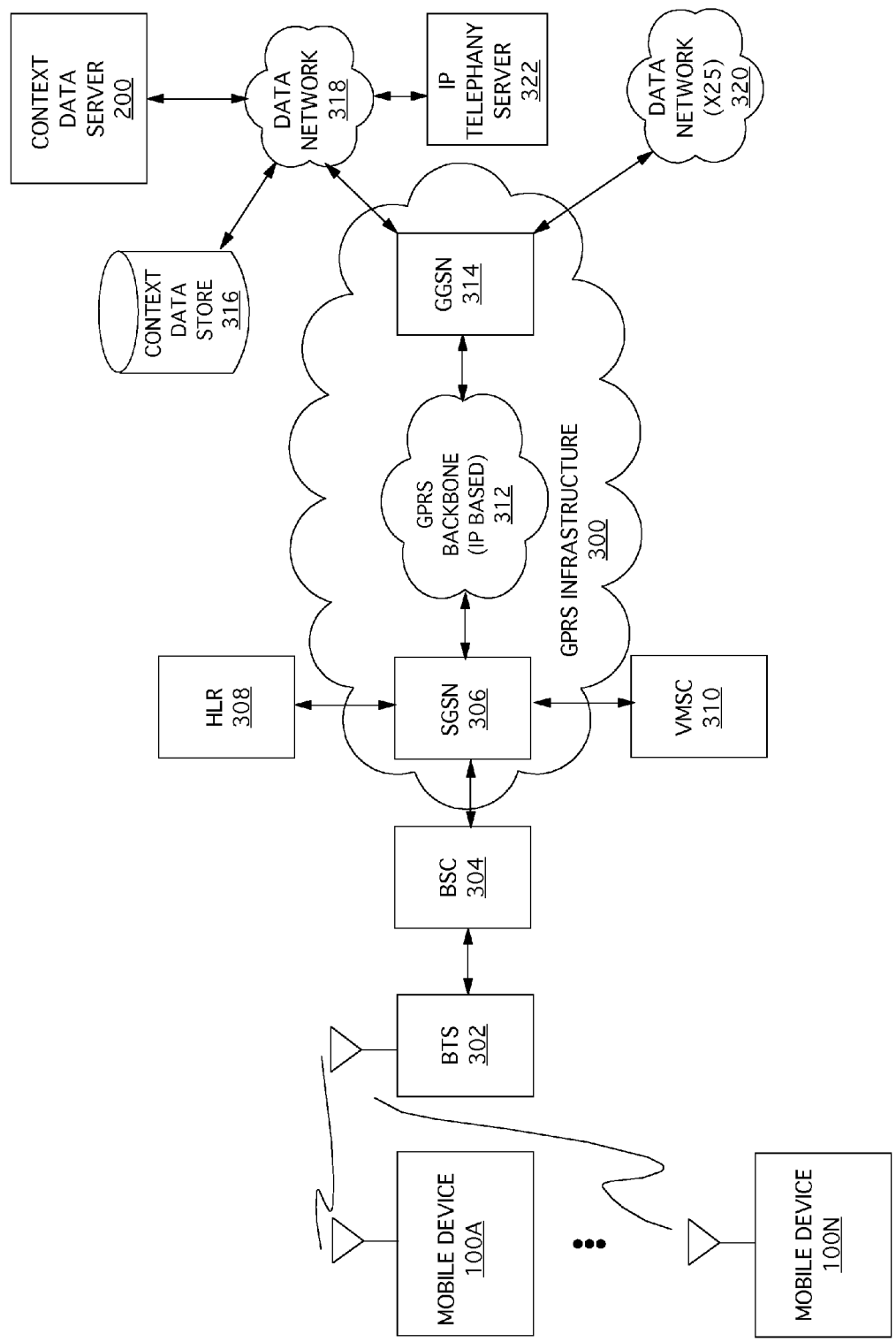
FIG. 3 shows an example voice-message system and context-data server implemented within an example general packet radio service system (GPRS), according to an example embodiment.
Figure 4:
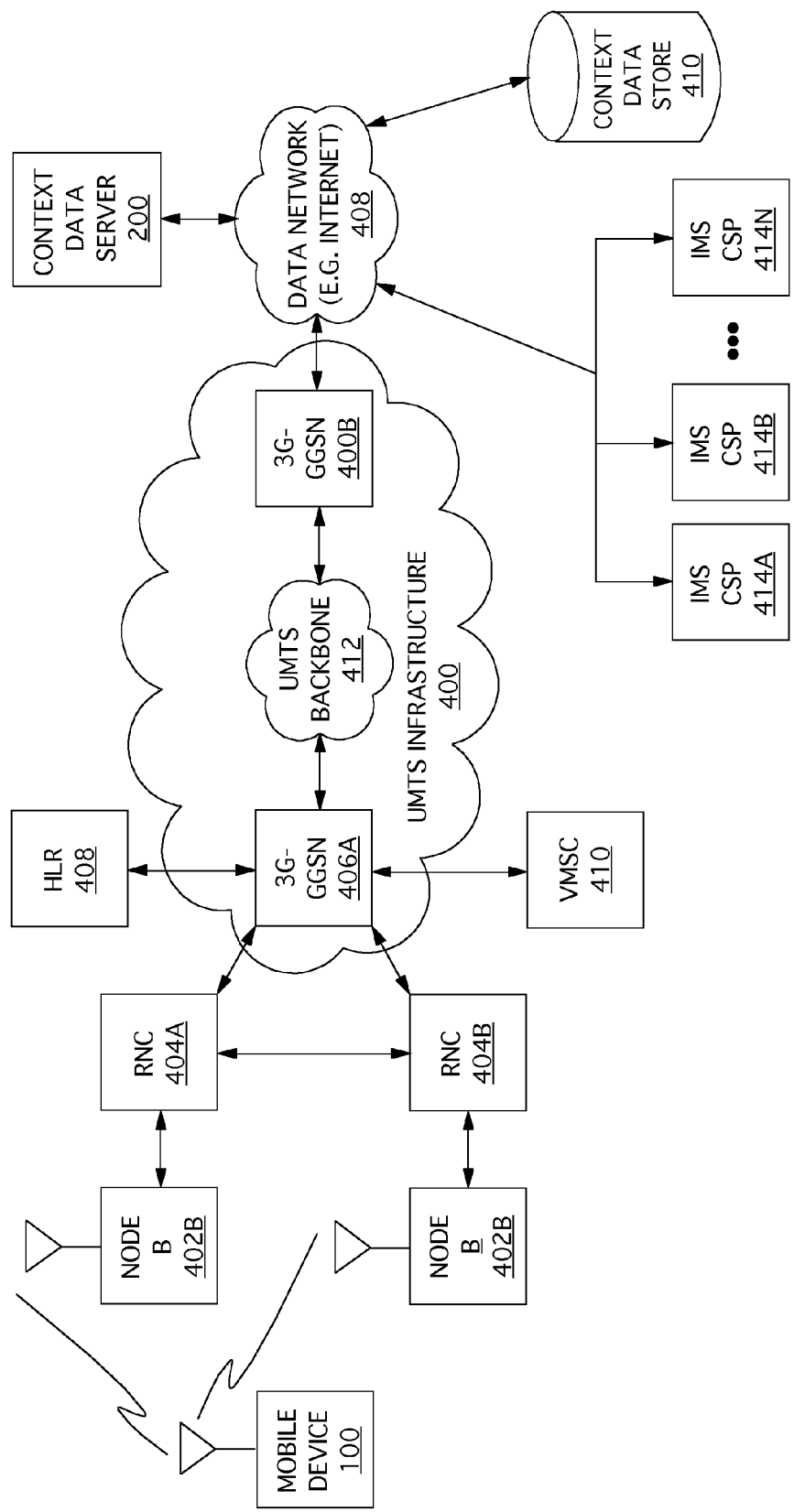
FIG. 4 shows an example voice-message system and context-data server implemented within an example universal mobile telecommunications system (UMTS) packet network architecture, according to another example embodiment.

The context-data server 200 may also include communication connections 218 that allow the device to communicate with other computing devices over a communication network (e.g. a data network such as the Internet, the networks of FIGS. 3 and 4). Communication connections 218 are one example of communication media. Communication media may typically be embodied by computer readable instructions, data structures, program modules, or other data in a modulated data signal, such as a carrier wave or other transport mechanism, and includes any information delivery media. The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. The computer readable media as used herein may include both storage media and communication media according to various example embodiments. In an example embodiment, the context-data server 200 may provide instructions to a mobile device 100 to acquire and analyze certain context-data and then communicate the context-data to the context-data server 200.

FIG. 3 shows an example voice-message system and context-data server implemented within an example general packet radio service (GPRS) system, according to an example embodiment. As shown in FIG. 3, the GPRS system is capable of being communicatively coupled to various data networks including, for instance, the data network 318 and/or the x.25 network 320. The data network 318 may be a packet-switched network (e.g. the Internet). According to one embodiment, the data network 318 may use the standard Internet Protocol Suite (TCP/IP). The data network 318 may also support various communication services such as internet telephony (e.g. VoIP), email, various file transfer protocols (e.g. FTP), a hypertext transfer protocol (HTTP) etc. The context-data server 200 may analyze voice messages (e.g. voice mail, short voice messages, voice SMS, IP telephony voice communication) propagated over the GPRS system as described both supra and infra. To assist in analyzing the information, the context-data server 200 can employ information maintained within the context-data store 316. For example, the context-data store 316 may include reference voice and sound data that is used in the identification of a particular voice and/or sound.

A mobile device 100A-N may communicate via a radio link to a Base Transceiver Station (BTS) 302 which is connected to a Base Station Controller (BSC) 304 in turn connected to the GPRS infrastructure 300. The GPRS infrastructure 300 may include various systems and subsystems utilized to support the GPRS system (e.g. an MSC, a SMSC, an IP Multimedia Subsystem (IMS) architecture, etc. The GPRS may be a data service for GSM. GPRS is a packet-switched mobile datacom service that is the next step in the evolution of GSM. GPRS may enable relatively high-speed mobile datacom usage and may be useful for applications such as mobile Internet browsing, email and push technologies. The GPRS infrastructure includes a serving GPRS support node (SGSN) 306 communicatively coupled to the BSC 304 as well as a gateway GPRS support node (GGSN) 314. The GGSN 314 may then be communicatively coupled the data networks 318 and 320. The SGSN 306 and GGSM 314 may be interconnected by a GPRS backbone (e.g. IP based) 312. The SGSN 306 may be connected to a home location register (HLR) 308. In an example embodiment, SGSN 306 may communicatively couple the GPRS system of FIG. 3 to other communication networks such as a GSM Network Subsystem, and/or another GPRS system.

The GPRS system of FIG. 3 may also support a voice message service. For example, the SGSN 306 may be communicatively coupled to a voice message service center (VMSC) 310. In one embodiment, the VMSC 310 may support a variety of asynchronous voice communication types including, inter alia, voice mail, short voice message service, voice SMS and/or a VoIP supported voice instant messaging. For example, the VMSC 310 may utilize the protocol layer for the existing SMS point-to-point service of the example GPRS service of FIG. 3 with the capability to transfer short messages. A short message may have 140 octets of data in each packet data unit (PDU). The SMS service may provide the capability of concatenating messages of a length that may be increased (e.g. to 38,760 or 16,830) depending on the particular character-coding scheme employed. These concatenated PDUs can be strung together to form a short voice message, according one embodiment, in any combination of from 1 to 255 PDUs of 140 octets each. In this way, short voice messages may be transmitted between a mobile device 100A and another mobile device 100N. Other example embodiments may utilize this method to communicate short voice messages from a mobile device 100A to the context-data server 200.

In another embodiment, the VMSC 310 may also support voice calls (e.g. VoIP services such as Skype™). Thus, the other embodiment may allow for 'real time' acquisition, determination and association of context data with a voice-message component voice call in the network of FIG. 3 (assuming a processing and transmission latency). For example, the VMSC 310 may communicate voice call data to the context-data server 200. The context-data server 200 may analyze certain components of the voice call data such particular words or phrases. The context-data server 200 may then acquire context-data from the originating mobile device 100 A-N. The context-data server 200 may determine and associate the context-data with various components of the voice call data. The context-data server 200 may utilize the Internet and/or the context-data store to acquire supplemental information about the context-data. The context-data server 200 may then forward the association data and the supplemental information to a receiving mobile device 100N (or in other embodiments a receiving computer operating a voice-call program) and/or the VMSC 310. The VMSC 310 may then forward the association data and/or the additional information. The IP telephony server 322 may provide support for communication of voice messages over the data network 318.

FIG. 4 shows an example voice-message system and context-data server implemented within an example universal mobile telecommunications system (UMTS) packet network architecture, according to another example embodiment. A UMTS infrastructure 400 is shown in FIG. 4 communicatively coupled to a data network 408 such as the Internet. At the subscriber side, a mobile device 100 is communicatively coupled by one or more radio links to one or more corresponding Node Bs 402 A-B. The Node Bs 402 A-B are in turn communicatively coupled to corresponding radio network controllers (RNCs) 404 A-B. The RNCs 404 A-B may be interconnected as shown for purposes of improving the radio links and facilitating handover. The RNCs 404 are connected to the UMTS infrastructure 400 (e.g. via Iu interfaces) to a third generation-serving GPRS support node (3G-SGSN) 406A (by way of example, however, future generation serving GPRS support nodes may also be employed). This may be also communicatively coupled to an HLR 408 similar to the HLR 308 of FIG. 3. The 3G-GGSN 406A may be communicatively coupled to a 3G-gateway GPRS support node (3G-GGSN) 406 B by means of the IP-based UMTS backbone 412. It may also be communicatively coupled to a VMSC 410 similar to the VMSC of FIG. 3. According to a particular example embodiment, the VMSC 410 may also be communicatively coupled with other communication networks including, a GSM Network Subsystem, another UMTS infrastructure, a GPRS infrastructure network and/or another type of cellular network.

A context-data server 200 and a context-data store 410 may be communicatively coupled to the data network 408. Additionally, IMS content service providers (CSPs) 414 A-N may be communicatively coupled to the data network 408 as well. The IP multimedia subsystem (IMS) content may be provided by IMS CSPs 414 A-N. IMS is a standardized Next Generation Network (NGN) architecture that converges mobile and fixed multimedia services.

IMS can support VoIP based on a 3GPP (3rd Generation Partnership Project) standardized implementation of a Session Initiation Protocol (SIP), and can operate over a standard Internet protocol (IP) network. The systems of FIGS. 3 and 4 utilizing packet-switched or circuit switched techniques can be supported by IMS. For example, IMS may provide current and future communication services that are implemented using the data network 408. IMS may use open standard protocols defined by the Internet Engineering Task Force (IETF).

It should be noted that the networks of FIGS. 3 and 4 are provided by way of example and that other embodiments may be implemented on other types of communication networks including, inter alia, a GSM network, a network of FIG. 3 or FIG. 4 implementing an IM cloud and/or other future generation cellular and IP networks.

FIG. 5 illustrates an example system that can determine context data and associate the context data with a voice-message component, according to one embodiment. Context data sensors 124 A-N measure, detect or sense certain environment attributes relevant to the context of the mobile device 100, convert these attributes to electrical signals and communicate the signals to the context-data acquisition module 132. Example attributes include user state information, ambient sounds, voices, and other context data as described supra. The context data acquisition module 132 may acquire, parse and decode certain signals according to instructions received from the context-data analyzer 134. Generally, the context-data analyzer 134 may perform the operations provided in the description of FIG. 1 supra. More particularly, the context-data analyzer 134 may include a voice recognition component 500, a sound recognition component 502 and a voice-message configuration component 504. The context-data analyzer 134 may query historical context data 506. The historical context data 506 may be stored in any storage device provided in FIGS. 1-4. The historical context data 506 may include an index of past context-data and may be utilized to enrich present context-data. A machine-learning system of the context-data analyzer 134 may also utilize the historical context data 506 to improve a function of the context-data analyzer 134.

The voice-recognition component 500 may convert spoken words to text. The voice recognition component 500 may also identify particular voices. The voice recognition component 500 may query a voice identity database 508. Furthermore, the voice recognition component 500 may identify voice timbre and other patterns. The context-data analyzer 134 may determine a meaning to the voice timbre and other patterns. The voice identity database 508 may include an index of predefined voice and person identification data, as well as voice recognition algorithms. The voice recognition component 500 may also recognize predefined words or phrases spoken by an analyzed voice (e.g. 'get help'). If a particular word or phrase is recognized (e.g. by using a table), the voice recognition component 500 may propagate an instruction to another system component.

The sound recognition component 502 may also identify particular types of ambient sounds of the mobile device 100. The sound recognition component 502 may query a sound identity database 510. The voice identity database 510 may include an index of predefined sound identification data, as well as sound recognition algorithms. If a particular sound is recognized, the sound recognition component 502 may propagate an instruction to another system component. For example, if the sound of a person screaming is recognized, the sound recognition component 502 may propagate an instruction for a text message with present location data to be communicated by the mobile device 100 to a local EMS authority.

In one embodiment, the voice-message configuration component 504 may configure a voice message to include both the voice message and associated context data. The voice-message configuration component 504 then renders the voice message into a form for communication over a communication network. However, in another embodiment, the voice-message configuration component 504 may render the voice message and the context-data to be propagated separately over a communication network. The voice-message configuration component 504 may also render the voice message and context-data in different forms for propagation over a communication network according to different communications protocols.

Figure 6:
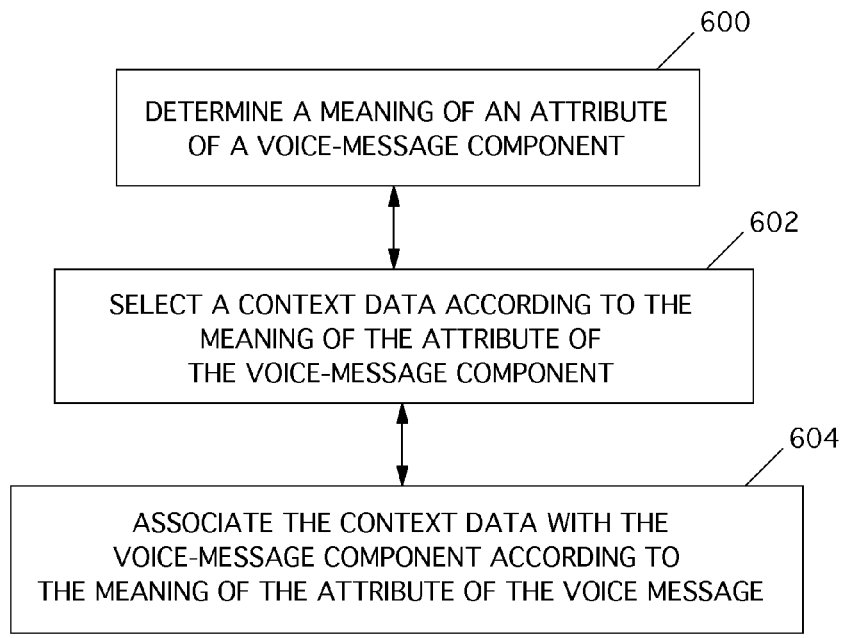
FIG. 6 shows a flow chart that describes the steps of a method of one embodiment.

FIG. 6 is a flow chart that describes steps of a method of one embodiment. In operation 600, the meaning of an attribute of a voice-message component is determined. For example, the context-data analyzer 134 may determine the meaning of the word "here" to be the present location of the mobile device 100. In operation 602, a context data is selected according to the meaning of the attribute of the voice-message component. For example, context-data analyzer 134 may select a particular street address through analysis of GPS data associated with the present location of the mobile device 100. In operation 704, the context data is associated with the voice-message component according to the meaning of the attribute of the voice-message component. The elements of FIGS. 1, 2 and 5 may be utilized to perform operation 604.

Figure 7:
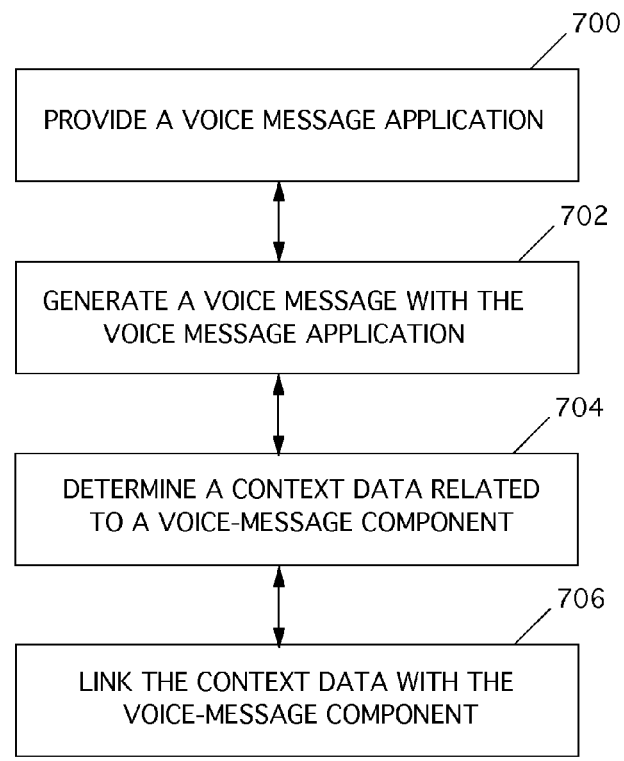
FIG. 7 shows a flow chart that describes the steps of a method of another embodiment.

FIG. 7 shows a flow chart that describes the steps of a method of another example embodiment. In operation 700, a voice-message application is provided. A voice message is generated with the voice-message application in operation 702. A context data related to a voice-message component is determined in operation 704. In operation 706, the context-data is linked with the voice-message component. The elements of FIGS. 1-5 may be utilized to perform operations 700-706.

Figure 8A:
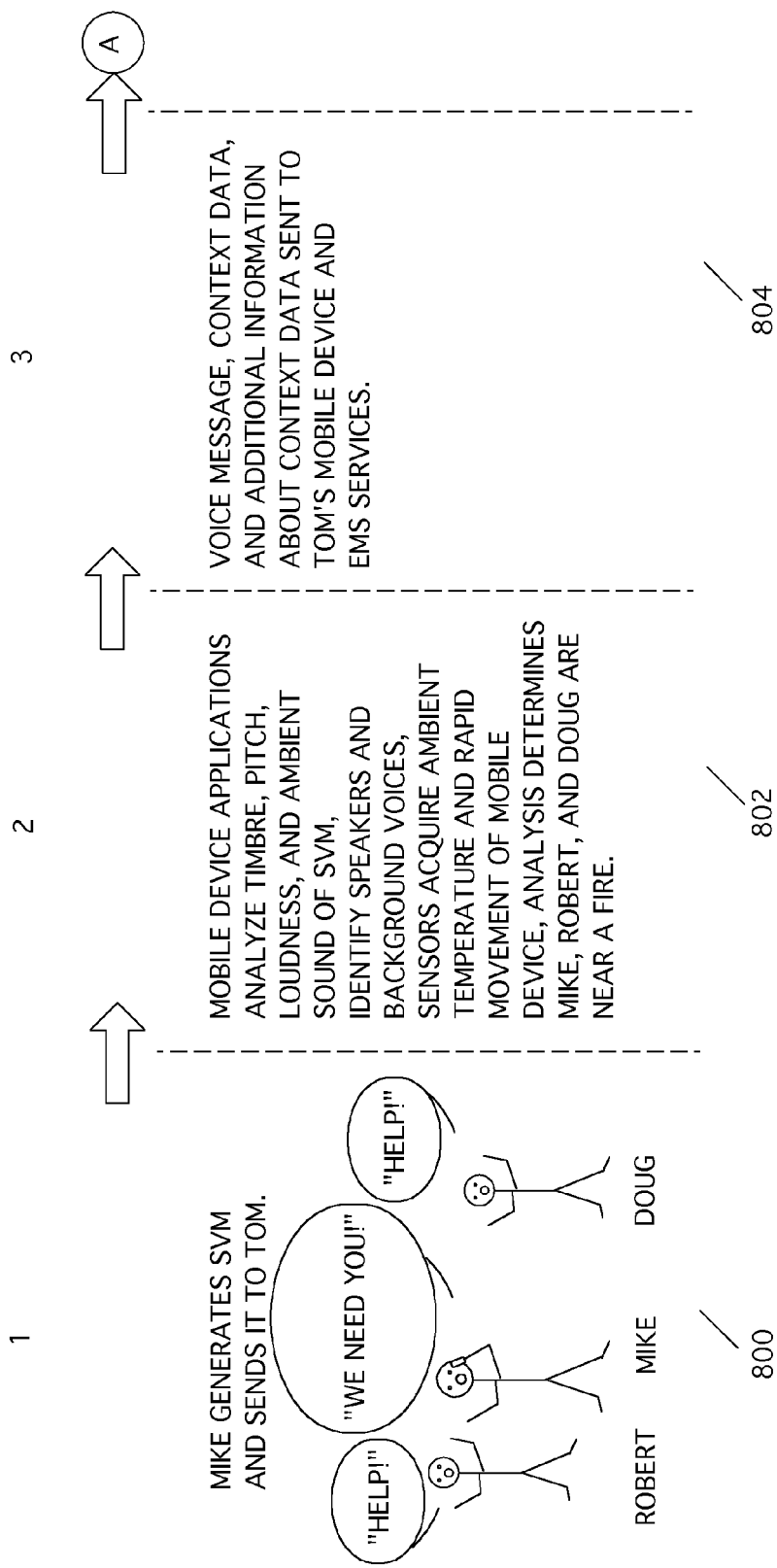
FIGS 8A-B illustrate an example implementation, according to some embodiments.
Figure 8B:
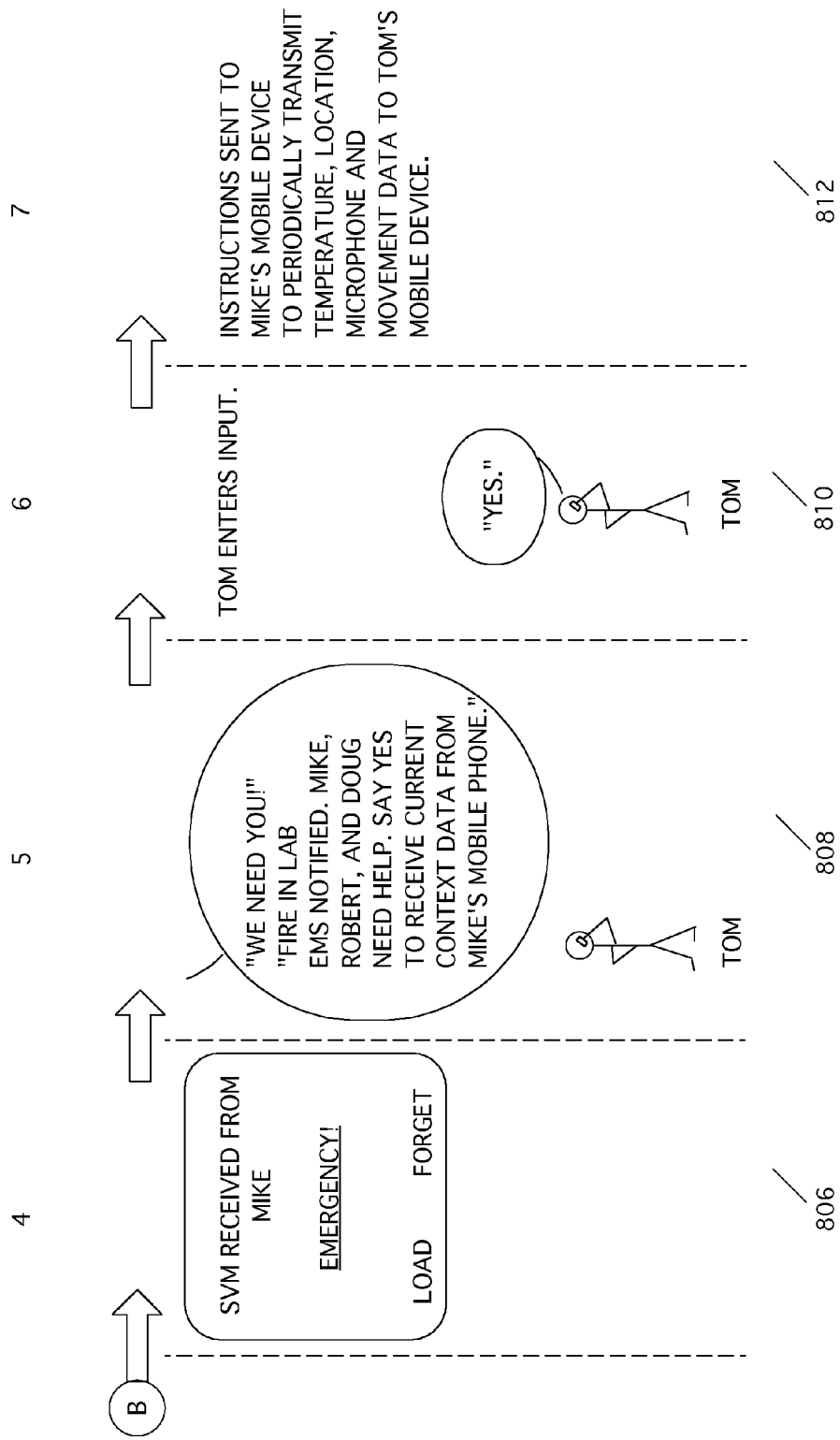

By way of example and not of limitation, FIG. 8 shows an example application of the above describes systems and methods according to one embodiment. In vignette 1 800, Mike, Doug and Robert are in a laboratory when a fire breaks out. Mike uses his mobile device 100A to generate and send a short voice message (SVM) to Tom's mobile device 100N. Mike's SVM includes a panicked statement, "We need you." The SVM also records Doug and Robert yelling "Help!" in the background.

In vignette 2 802, the applications 110 (e.g. the context-data acquisition module 132 and the context-data analyzer 134), and the context-data sensors 124 A-N operate to analyze the SVM, determine what types of context data to associate with various components of the SVM, acquire the context data and transmit the associations and context data to, inter alia, Tom's mobile device 100 N. For example, the applications 110 may transcribed the SVM to text. The written transcription of the message is analyzed by the context-data analyzer 134. The context-data analyzer 134 associates certain context data to certain words, phrases and word structure patterns in the SVM. Furthermore, in this particular example, the timbre, pitch, loudness and spacing of the spoken message are analyzed to provide additional context information. Secondary (or background) sounds are also analyzed to provide supplementary context information (e.g. the sound of a fire in the background, Robert and Doug yelling for help). The context-data analyzer 134 may use pattern-recognition software to match the content components of the SVM against a database containing, inter alia, appropriate context-data to match to a given SVM component, context-data acquisition operations and additional operations to acquire supplemental information about context data.

In vignette 3 804 Mike's mobile device 100A may transmit the SVM, the context-data and supplemental information about the context data to Mike's mobile device 100N. In the present case, the context-data analyzer 134 may determine that an emergency is extant. Consequently, the context-data analyzer 134 may generate a message and instruct other applications of Mike's mobile device 100A to transmit the SVM (including context-data) to an appropriate emergency services (EMS) provider based on the present location of Mike's mobile device 100 A.

Vignette 4 806 shows an example display on Tom's mobile device 100 N indicating that an SVM has been received from Mike's mobile device 100A. Tom may load the SVM and concomitant context and supplementary data with the 'load' virtual button or not load with the 'forget' virtual button. In the present case, the context-data analyzer 134 of Mike's mobile device 100 may have included an instruction that cause the graphical user interface (GUI) driver of Tom's mobile device 100N to display the word 'emergency' contemporaneously with the SVM received indication.

Vignette 5 808 shows Tom listening to the voice content provided if he chooses to load the SVM. First, Tom hears the actual SVM content recorded by Mike. In the background, Tom may hear other noises including individuals yelling for help and fire sounds. A second computer-generated voice recording then informs Tom of the context data and supplementary data. Tom may then be presented with an option to input "yes" with his voice if he would like to periodically receive context data updates from Mike's mobile device 100A. In vignette 6 810 Tom inputs "yes". In vignette 7 812, Tom's mobile device 100N then transmits instructions to Mike's mobile device 100A to periodically transmit fire-type emergency context-appropriate data that can be acquired by the context-data sensors 124 A-N of Mike's mobile device 100A (e.g. temperature, location, microphone and movement data). It should be noted that the context-sensor capabilities of Mike's mobile device may be an example of one type of supplementary data that may be transmitted to Tom's mobile device 100N. For example, the context-data analyzer 134 of Mike's mobile device may query an index in an available database (e.g. storage 108) to determine fire-type emergency context-appropriate data and concomitant context-data sensors 124 A-N.

By way of explanation and not of limitation, other specific examples are now described. It should be noted that these examples may be implemented with the various systems and methods of FIGS. 1 to 7 according to various embodiments. These examples are merely intended, like the example of FIGS. 8 A-B, as possible specific implementations of the systems and Methods of FIGS. 1 to 7 and are merely illustrative in nature. Furthermore, the following examples should not be used to limit any possible applications of the systems and methods of FIGS. 1 to 7.

In the first example, a sender creates a voice message "meet me here" while in a jazz bar. Certain systems and methods of FIGS. 1 to 7 may generate context data based on words, phrases, or word structure patterns in the spoken message. Certain systems and methods of FIGS. 1 to 7 may then compare the jazz music playing in the background to a database of sound recordings and a identify the jazz song. Additionally, GPS location data may be obtained. The jazz song identification and GPS data are both provided to a receiver's mobile device and included as input into other operations that obtain information from analyzing the spoken message and its background. It is believed that this analysis may provide further richness, accuracy, and precision to context data. In this example, it is determined that the sender is inside of a jazz club, having a good time. Furthermore, a search of a historical context-data store indicates that the receiver enjoys the particular sub-genre of jazz being played. All this information is provided to the receiver. In a more specific example, the context data and supplemental information may be stored separately on a context-data server. After listening to the voice message, the recipient may have the option of loading the context-data. In a yet more specific example, certain systems and methods of FIGS. 1 to 7 may identify the voices of Peter, Mike, Susan and the sender by comparison operation utilizing a database of previous sound recordings. Certain systems and methods of FIGS. 1 to 7 then indicate to the recipient the names of those present along with profile information, links to social networking and micro-blogging site, pictures, etc.

In another specific example, Katie, a teenage girl, would like to send a secret message to her friends about her plans for the evening while misdirecting her parents (who are within earshot distance) as she creates a voice message. Katie has pre-programmed certain words and phrases to have alternative meanings. For instance, she could have pre-programmed the voice message phrase "in the library" to actually mean "at the mall." In this case, her friends would receive the original voice message "I'll be in the library" and would have to pull up the additional context information to get either a text message "I'll be at the mall" or a 'doctored' voice message "I'll be at the mall." In another specific example, Katie could also have pre-programmed certain tempo (e.g. length of pause duration between words) patterns to indicate actually meaning. Depending of the particular tempo pattern, speaking the phrase "in the library" could actually mean "in the library", "at the mall" or other pre-programmed meanings (e.g. "at the beach"). For example, "AT<pause>THE<pause>LIBRARY" may be pre-programmed to mean "at the mall", "AT<pause><pause>THE<pause><pause>LIBRARY" may be pre-programmed to mean "at the library" and "AT<pause><pause><pause>THE<pause><pause><pause>LIBRARY" may be pre-programmed to mean "at the beach". Additionally, other properties of the spoken word (e.g. tone) could also be pre-programmed to indicate actually meaning. Certain systems and methods of FIGS. 1 to 7 may be utilized to implement this specific example.

In yet another specific example, a user of a mobile device may create a voice message "the french fries at Kirk's are great" and posts the voice message to a micro-blogging website. Certain systems and methods of FIGS. 1 to 7 could associate the user's review to the words "french fries" and coupons/advertisements available from a search of the Internet to the word "Kirk's". The additional context data could be provided on the micro-blogging website in the form of a voice message and/or a text message.

In still yet another specific example, a user of a mobile device may create a voice message "get me this" while in a clothing store. Certain systems and methods of FIGS. 1 to 7 could analyze the voice message, determine the meaning of the word "this" and identify the clothing item associated with the term this (e.g. with image identification software, Radio-frequency identification (RFID)). Certain systems and methods of FIGS. 1 to 7 may then transmit the identity of the clothing item, the price of the clothing item and the location of the retail store as context data (and supplementary data, for example, if an Internet search determines that the clothing item will soon go on sale) to the voice message recipient.

Although the present embodiments have been described with reference to specific example embodiments, various modifications and changes may be made to these embodiments without departing from the broader spirit and scope of the various embodiments. For example, the various devices, modules, etc. described herein may be enabled and operated using hardware circuitry, firmware, software or any combination of hardware, firmware, and software (e.g., embodied in a machine-readable medium).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
    receiving a user-generated voice-message generated with a mobile device;
    converting a voice-message component into a text format;
    automatically determining a meaning of the voice-message component; and
    automatically determining a context data, wherein the context data describes an environmental attribute of the mobile device relating to the meaning of the voice-message component;
    automatically selecting the context data according to the meaning of the attribute of the voice-message component;
    acquiring the context data from a sensor of the mobile device; and
    linking the context data with the voice-message component in the user-generated voice message.

2. The method of claim 1 further comprising:
    encoding the context data into a voice message signal.

3. The method of claim 2, wherein the voice message comprises a short voice message.

4. The method of claim 3, wherein the attribute of the voice message comprises at least one of a word, a phrase, a voice timbre, a duration of a pause between two words, a volume of a voice and an ambient sound.

5. The method of claim 3 further comprising:
    determining a meaning of the attribute of the voice-message component.

6. The method of claim 1 further comprising:
    identifying at least one ambient sound of the voice message with a sound recognition algorithm.

7. The method of claim 1 further comprising:
    identifying at least one speaker of the voice message with a voice recognition algorithm.

8. The method of claim 1 further comprising:
    selecting the context data according to a state of a mobile device used to generate the voice message.

9. A system comprising:
    a processor;
    a computer-readable memory communicatively coupled with the processor;
    a voice-message application resident on the computer-readable memory to generate user-generated voice message;
    a context-data application to automatically determine a context-data related to a meaning of a voice-message component and to link the context-data with the voice-message component, to convert a voice-message component into a text format, to automatically determine a meaning of the voice-message component, and to automatically determine a context data, wherein the context data describes an environmental attribute of the mobile device relating to the meaning of the voice-message component; and
    a sensor to automatically acquire the context data.

10. The system of claim 9,
    wherein the context-data application automatically determines the meaning of the voice-message component by translating the voice-message component into a text format and uses a table to link the text format of the voice-message component to the context data type to be acquired by the sensor.

11. The system of claim 9 further comprising:
    a machine-learning application to incorporate intelligence into the context-data application.

* * * * *